United States Patent
Yamamoto et al.

(10) Patent No.: US 10,826,411 B2
(45) Date of Patent: Nov. 3, 2020

(54) DEVICE FOR CONTROLLING POWER CONVERSION CIRCUIT

(71) Applicant: MEIDENSHA CORPORATION, Tokyo (JP)

(72) Inventors: Yasuhiro Yamamoto, Ichinomiya (JP); Shizunori Hamada, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/604,668

(22) PCT Filed: Mar. 19, 2018

(86) PCT No.: PCT/JP2018/010710
§ 371 (c)(1),
(2) Date: Oct. 11, 2019

(87) PCT Pub. No.: WO2018/190076
PCT Pub. Date: Oct. 18, 2018

(65) Prior Publication Data
US 2020/0169185 A1 May 28, 2020

(30) Foreign Application Priority Data
Apr. 12, 2017 (JP) ................................. 2017-078578

(51) Int. Cl.
*H02M 7/5387* (2007.01)
*H02P 27/08* (2006.01)

(52) U.S. Cl.
CPC ......... *H02M 7/53871* (2013.01); *H02P 27/08* (2013.01)

(58) Field of Classification Search
CPC . H02M 2001/0003; H02M 2001/0012; H02M 2001/0019; H02M 7/527;
(Continued)

(56) References Cited

U.S. PATENT DOCUMENTS

| 5,811,949 A * | 9/1998 | Garces | H02M 7/53875 318/448 |
| 2003/0163296 A1* | 8/2003 | Richards | H02M 7/53873 703/14 |

(Continued)

FOREIGN PATENT DOCUMENTS

| JP | 60-118082 A | 6/1985 |
| JP | 02-307369 A | 12/1990 |

(Continued)

OTHER PUBLICATIONS

Yoshihiro Murai et al., Waveform Distortion and Correction Circuit for PWM Inverters with Switching Lag-Times, IEEE Transactions on Industry Applications, vol. IA-23, No. 5, Sep./Oct. 1987, pp. 881-886.

*Primary Examiner* — Alex Torres-Rivera
(74) *Attorney, Agent, or Firm* — Foley & Lardner LLP

(57) ABSTRACT

A controller for a power conversion circuit includes a first limiter for limiting a compensating voltage component within a compensating voltage switching level. A delay time measurement section measures an ON-delay time and an OFF-delay time, based on a binarized digital value and a PWM command value. A multiplier calculates an error voltage component average value by multiplying an average value of the ON-delay time and the OFF-delay time by a value that is obtained by dividing a direct-current power supply voltage by a half cycle of a triangular wave carrier signal. A second limiter extracts a component of the error voltage component average value that is beyond the compensating voltage switching level in absolute value. An adder sets a combined compensating voltage component to a sum of a limited compensating voltage component outputted by the first limiter and a limited error voltage component outputted by the second limiter.

4 Claims, 14 Drawing Sheets

(58) Field of Classification Search
CPC .... H02M 7/529; H02M 7/53; H02M 7/53871; H02M 7/53873; H02M 7/53875; H02P 27/08

See application file for complete search history.

(56) References Cited

U.S. PATENT DOCUMENTS

| | | | |
|---|---|---|---|
| 2007/0210777 A1* | 9/2007 | Cervera | H02M 3/157 323/284 |
| 2011/0221382 A1* | 9/2011 | Hayashi | B62D 5/046 318/801 |
| 2019/0131910 A1* | 5/2019 | Ue | H02P 27/12 |

FOREIGN PATENT DOCUMENTS

| | | |
|---|---|---|
| JP | 06-62580 A | 3/1994 |
| JP | 2001-352762 A | 12/2001 |
| JP | 2004-201414 A | 7/2004 |
| JP | 2008-178159 A | 7/2008 |
| JP | 2009-254032 A | 10/2009 |
| JP | 2011-055608 A | 3/2011 |
| JP | 2012-016232 A | 1/2012 |
| JP | 2012-044785 A | 3/2012 |
| JP | 2015-047021 A | 3/2015 |
| JP | 2017-046500 A | 3/2017 |

\* cited by examiner

ELECTRIC CURRENT WAVEFORM

FIG.3B1
COMPENSATING VOLTAGE COMPONENT CORRESPONDING TO dT_on

FIG.3B2
COMPENSATING VOLTAGE COMPONENT CORRESPONDING TO dT_off

COMPENSATING VOLTAGE COMPONENT CORRESPONDING TO AVERAGE OF dT_on AND dT_off dVt_FB_ave dV/mixed FF/FB COMBINED COMPENSATION WAVEFORM

DEVICE FOR CONTROLLING POWER CONVERSION CIRCUIT

TECHNICAL FIELD

The present invention relates generally to a controller for a power conversion circuit for PWM control of semiconductor switching elements, and particularly to a dead time compensation system.

BACKGROUND ART

<Basic System Configuration>

FIG. 14 is a diagram showing an example of motor drive system employing a three-phase inverter. A direct-current power supply voltage Vdc and six-arm semiconductor switching elements Su, Sv, Sw, Sx, Sy, Sz are combined together to form a three-phase voltage source inverter (power conversion circuit). Each semiconductor switching element is implemented by a combination of an IGBT and an antiparallel diode.

FIG. 15 is a block diagram showing an example of control of the three-phase voltage source inverter. FIG. 15 shows functions downstream of input of electric current command value Iref_dq of an orthogonal biaxial rotating coordinate system (dq-axes) which is given by a vector control system or the like.

In this system, a load is assumed to be a motor M. In many cases of digital control, an electric current control system is configured with respect to an orthogonal biaxial rotating coordinate system synchronized with a rotation angle of the motor M. For simplification of description of variables, three-phase components are represented as three-phase electric current components are represented by Idet_uvw, and two-axis components are represented as two-axis electric current components are represented by Iref_dq. When only one of the three-phase components or one of the two-axis components is to be indicated, it is represented as U-phase electric current detection value Idet(u) or the like.

In FIG. 15, an electric current control section ACR is a basic electric current control section configured to perform PI control of a difference between two-phase electric current command value Iref_dq of the rotating coordinate system and two-phase electric current detection value Idet_dq of the rotating coordinate system, and output two-phase voltage command value Vref_dq of the rotating coordinate system for motor driving.

An electric current sensor HCT detects analogue electric current detection value i_uvw, and an AD-converter AD converts it to a digital value, and outputs three-phase electric current detection value Idet_uvw. A three-phase to two-phase transformer "3ph/2ph" transforms three-phase electric current detection value Idet_uvw to two-phase electric current detection value Idet_αβ of a stationary coordinate system. A rotating coordinate system transformer "αβ/dq" transforms two-phase electric current detection value Idet_αβ of the stationary coordinate system to two-phase electric current detection value Idet_dq of the rotating coordinate system.

The electric current control section ACR outputs two-phase voltage command value Vref_dq of the rotating coordinate system, which is transformed to two-phase voltage command value Vref_αβ by an inverse rotating coordinate system transformer "dq/αβ". A two-phase to three-phase transformer "2ph/3ph" transforms two-phase voltage command value Vref_αβ of the rotating coordinate system to three-phase voltage command value Vref_uvw of the rotating coordinate system. A PWM-generation section "PWM" compares three-phase voltage command value Vref_uvw with a triangular wave carrier signal "Cry" about magnitude, and thereby finally generates PWM command value PWM_ref of the voltage source inverter.

Furthermore, a dead time adder "Deadtime" adds a dead time (time period for short circuit prevention) to PWM command value PWM_ref, and thereby generates six gate signals "Gate" in total for upper and lower arm semiconductor switching elements. A main circuit section outputs a potential Vdc of the power supply voltage and a zero-potential alternately, and supplies the load with a PWM voltage equivalent to the electric current command value. The foregoing configuration is a base arrangement of the electric current control system based on the voltage source inverter.

When PWM command value PWM_ref of each phase causes commutation from the lower arm to the upper arm, this state is defined as a state of switching-on (potential change from 0 to Vdc), and when PWM command value PWM_ref of each phase causes commutation from the upper arm to the lower arm, this state is defined as a state of switching-off (potential change from Vdc to 0).

However, there is a component of delay time due to gate driving and switching of elements of the main circuit. Therefore, for gate signal Gate to be outputted to the upper-arm and lower-arm semiconductor switching elements (Su and Sx, for example) of FIG. 14, it is required to add a dead time that is a short circuit preventing period where both arms are turned off.

It is known that this causes an error between PWM command value PWM_ref and an actually-outputted voltage pattern. The error causes a voltage disturbance against electric current control, and thereby causes a distortion in output electric current.

During the dead time, both of upper and lower IGBTs are turned off, so that an electric current flows across an antiparallel diode. The flow path of output current is switched depending on the polarity of the output current between the upper and lower conductive diodes. When the electric current is in a negative direction (from the load to the main circuit), the electric current flows across the upper arm so that the electric potential Vdc occurs at an output terminal. On the other hand, when the electric current is in a positive direction (from the main circuit to the load), the electric current flows across the lower arm so that the zero potential occurs at the output terminal.

The component that the electric potential varies due to the electric current polarity is referred to as error voltage due to dead time. The error voltage causes a large amount of distortion, when the electric current polarity switches, namely, at or close to a zero-crossing point of sinewave waveform of the electric current.

The electric current control system compensates for the voltage disturbance in order to follow two-phase electric current command value Iref_dq of the rotating coordinate system. However, the response of control is limited, so that the waveform distortion remains at the zero-crossing point. The distortion of electric current causes fluctuations in torque, and may thereby cause a phenomenon where the motor becomes unstable.

Therefore, systems have been proposed to detect or estimate and compensate for the component of error voltage due to dead time, which is referred to as dead time compensation. Various dead time compensation systems have been already reported by many prior art documents, and roughly categorized by their principles and compared as follows, where individual detailed description is omitted.

<Categorization of Prior Art Documents by Principle>

Selected criteria of categorization are "what information it is based on", "what is a target of compensation", and "whether element voltage drop is taken into account".

<Categorization 1: Categorization by Information to which Reference is Made>

(a) System employing information of output electric current (command value or detection value), (b) System employing information of output voltage (command value or detection value), (c) System measuring switching delay time (output potential is binarized as Vdc/O, and (d) System employing a plurality of pieces of information described above.

<Categorization 2: Categorization by Target to be Compensated>

(a) System delaying PWM pulse edges (switching ON and switching OFF) for correction, and (b) System correcting voltage command value by error voltage component at a stage before generation of PWM command value.

<Categorization 3: Categorization by Timing of Compensation Calculation>

(a) System performing correcting calculation at high speed per a half cycle of a triangular wave carrier signal as a unit, and (b) System learning a correction pattern by a long time of learning, based on detection of an effective value of basic waveform and a fluctuating component of a sixth harmonic or the like.

<Categorization 4: Categorization by Component of Error Voltage to be Compensated>

(a) System correcting only an error voltage resulting from switching delay component, (b) System correcting not only an error voltage resulting from switching delay component but also a voltage error component of main circuit, and (c) System detecting and compensating for high-speed variation of direct-current power supply voltage Vdc, in addition to the system (b).

There are many conventional systems, where ten of them which relate to the present disclosure are selected and listed below as prior art documents. Table 1 below shows a result of application of the categorizations described above, where various systems are based on various combinations.

Two embodiments of the present disclosure which are described below are included in lower rows.

|  | (Categorization 1) | (Categorization 2) | (Categorization 3) | (Categorization 4) |
|---|---|---|---|---|
| Patent Document 1 | a: detection | a | a | a |
| Patent Document 2 | a: command | b | a | a |
| Non-Patent Document 1 | c | a | a | a |
| Patent Document 3 | c | a | a | a |
| Patent Document 4 | c | b | a | a |
| Patent Document 5 | b | b | a | c |
| Patent Document 6 | a & b | b | a | b |
| Patent Document 7 | a | b | a | c |
| Patent Document 8 | a | b | b | b |
| Patent Document 9 | a & b | b | b | b |
| Embodiment 1 | a | b | a | a |
| Embodiment 2 | a | b | a | b |

The present disclosure employs techniques contained in patent document 2, patent document 4, and patent document 6. The following describes systems based on combination of these functions. The other prior art documents are cited for comparison about functions. The two embodiments described below employ functions of the prior art documents as follows.

Embodiment 1

System based on combination of patent document 2 and patent document 4, and

Embodiment 2

System based on combination of patent document 2 and patent document 4, and further combined with compensation for semiconductor switching element voltage drop according to patent document 6.

First, the following summarizes patent document 2, patent document 4, and patent document 6.

<Summary of Patent Document 2>

FIG. 15 shows a control block diagram of patent document 2 in a manner similar to the present disclosure. First, the following describes "compensation system based on electric current command value" 2.

A compensating voltage calculating section dVi_comp is configured to receive input of three-phase electric current command value Iref_uvw and compensating voltage command value dVi_cmd, and calculate compensating voltage component dVi_FF in accordance with the electric current value of each phase. Compensating voltage component dVi_FF is added to three-phase voltage command value Vref_uvw at a stage upstream of PWM-generation section PWM, to calculate a corrected voltage command value.

The calculation of compensating voltage component dVi_FF at the compensating voltage calculating section dVi_comp employs a function between electric current and compensating voltage as shown in FIG. 16. In case of a correction function having a curved shape shown by a solid line (a), compensating voltage component dVi_FF(u) has a complex waveform similar to a trapezoidal shape with respect to a sinewave electric current i(u) as shown in FIG. 17.

However, for strict expression of characteristics of the semiconductor switching element, it requires a heavy workload to set a correction function having a curved shape as shown by the solid line (a) in FIG. 16, and make adjustments based on strict measurement. Furthermore, even with the complex function shown by the solid line (a) in FIG. 16, it may be impossible to obtain a high accuracy of compensation, because variation of the semiconductor switching element and temperature variation cause a drift component in reality.

In view of the foregoing, in many cases, for simplification, approximation is made by a set of lines having a trapezoidal shape as shown by a chain line (b) in FIG. 16 with saturated compensating voltage dV_sat as a setpoint, or by a set of two values, i.e. positive and negative values, as shown by a dotted line (c).

There is a method which employs three-phase electric current detection value Idet_uvw instead of three-phase electric current command value Iref_uvw, as shown as "compensation system based on electric current command value" 3 in FIG. 15. In this case, compensating voltage calculating section dVi_comp is configured to receive input of three-phase electric current detection value Idet_uvw and compensating voltage command value dVi_cmd, and calculate and output compensating voltage component dVi_FB. It is different only in information about electric current component as a basis, but employs the same functions downstream of the compensating function, and adds compensating voltage component dVi_FB to three-phase voltage command value Vref_uvw.

The electric current detection value tends to be regarded as more accurate than the electric current command value, but the output electric current contains PWM ripples serving a factor of disturbance. Furthermore, it requires to sample and hold the output of the electric current sensor, and perform AD conversion, and perform a process of filtering for removal of electric current ripples. This causes a time delay inevitably.

The time delay in detection causes an increase in the zero-crossing point distortion of the electric current waveform, and thereby becomes a factor of degrading the compensating performance. In case of system configuration employing an electric current control system, a compensating system based on electric current command value with small time delay is advantageous in suppressing the zero-crossing point distortion of the electric current. However, there are cases of V/F control or the like where no electric current command value is provided. In such cases, it is required to use information of electric current detection value.

<Summary of Patent Document 3 and Patent Document 4>

FIG. 18 shows an example of configuration based on combination of patent document 3 and patent document 4. In this system, an electric potential binarization section "Sign" compares three-phase voltage detection value Vdet_uvw with an intermediate electric potential level such as Vdc/2, and thereby performs detection by approximation to binarized digital value PWM_det that is equal to H (potential of Vdc)/L (zero-potential). FIG. 19 shows a circuit for detecting ON-delay time dT_on and OFF-delay time dT_off by action of a delay time measurement section dTcount shown in FIG. 20.

The delay time measurement section dTcount is based on electric current detection, and uses a function equivalent to a measurement part of patent document 4 (FIGS. 2 and 3, [0029]-[0034]), wherein a value of voltage that is obtained by conversion from a time period of one clock (FIG. 3 of patent document 4) is equivalent to a conversion coefficient Vdc/(Tc/2) of the present disclosure that is obtained by dividing the direct-current power supply voltage by the half cycle of the triangular wave carrier signal. However, if both of delay time measurement and voltage conversion are simultaneously performed as in patent document 4, it is difficult to understand. Therefore, in FIG. 19 (FIG. 2), the delay time measurement section dTcount and unit converter dVtcomp are shown as two separate blocks.

In this way, about configuration of delay time measurement, it is substantially the same as conventional examples, and detailed description thereof is omitted. FIG. 20 shows a time chart similar to FIG. 3 of patent document 4, wherein only definition of different variables is clarified.

FIG. 20 is a timing chart showing behavior of PWM-generation section PWM, dead time adder Deadtime, delay time measurement, etc. The PWM-generation section PWM receives input of triangular wave carrier signal Cry as an input Cry, and input of three-phase voltage command values Vu*, Vv*, Vw* as an input "ref", and compares them about magnitude, and generates three-phase PWM command value PWM_ref as an output pwm (Pu, Pv, Pw in FIG. 20).

A trigger signal at a time instant of an upper peak of triangular wave carrier signal Cry is represented by Carry_Top, and a trigger signal at a time instant of a lower peak of triangular wave carrier signal Cry is represented by Carry_Btm.

Focusing attention on the U-phase about three-phase PWM command value PWM_ref, PWM command value Pu is converted by the dead time adder Deadtime into gate signals Gu, Gx for the upper-arm and lower-arm semiconductor switching elements Su, Sx. The gate signals Gu, Gx are at rest during a dead time Tdead.

Driven by the gate signals Gu, Gx containing the dead time Tdead, the waveform of voltage v(u) outputted by the main circuit varies in accordance with the polarity of electric current i(u). When the U-phase current flows in the negative direction from the main circuit, it has a waveform as indicated by [WITH +I(u)]. On the other hand, when the U-phase current flows from the load into the main circuit, it has a waveform as indicated by [WITH −I(u)].

Next, at each of switching-on and switching-off, the delay time from PWM command value Pu to V(u) is measured. Since switching-on occurs only during a period when triangular wave carrier signal Cry is falling, a count value ON_COUNT is reset to zero at the time instant of trigger signal Carry_Top. Count value ON_COUNT is counted up only while PWM command value Pu (PWM_ref)=H and v(u) (PWM_det)=L, for delay time measurement.

Upon completion of switching, count value ON_COUNT becomes constant, and is read as ON-delay time dT_on at a time instant slightly after trigger signal Carry_Btm (sufficiently after switching delay while the measured value is stable).

Similarly, since switching-off occurs only during a period when triangular wave carrier signal Cry is rising, a count value OFF_COUNT is reset to zero at the time instant of trigger signal Carry_Btm. Count value OFF_COUNT is counted up only while PWM command value Pu (PWM_ref)=L and v(u) (PWM_det)=H, for delay time measurement. Upon completion of switching, count value OFF_COUNT becomes constant, and is read as OFF-delay time dT_off at a time instant slightly after trigger signal Carry_Top while the measured value is stable.

The component of influence of the dead time is thus measured suitably, although the value of ON-delay time dT_on and the value of OFF-delay time dT_off for the case of [WITH +I(u)] are different from those for the case of [WITH −I(u)].

Patent document 3 discloses: synchronizing a correction period with triangular wave carrier signal Cry by the correction period synchronization section dTcomp in accordance with last values of ON-delay time dT_on and OFF-delay time dT_off; and thereafter delaying ON/OFF time instants of PWM pattern for delay time compensation, namely, compensating for a voltage disturbance component by adjustment of the pulse width, by a delay correction section 1 shown in FIG. 18.

Patent document 4 discloses: converting the measured ON-delay time dT_on and OFF-delay time dT_off by the conversion coefficient Vdc/(Tc/2) at the unit converter dVt-comp to error voltage component dVt_FB, which is added to the three-phase voltage command values for compensation for the error voltage component.

These systems can be regarded as systems for detecting and compensating for the delay time that is a component of error voltage in time. The former patent document 3 does not employ direct-current power supply voltage Vdc, and therefore cannot perform accurate compensation unless direct-current power supply voltage Vdc is constant. The latter patent document 4 is advantageous in accurately compensating for the error voltage even when direct-current power supply voltage Vdc changes from the time instant of error voltage measurement to the time instant of PWM generation.

<Summary of Patent Document 6>

This is a combination of the system of patent document 4 and a function of compensating for a semiconductor switching element voltage drop component (Categorization 4 (b)). The relationship of each phase between the electric current and voltage command value for compensating for the semiconductor switching element voltage drop component, has characteristics similar to the compensating function for the error voltage shown in FIG. 16. Accordingly, the voltage compensation scheme based on electric current of patent document 2 is used, and the setpoint of the quantity of compensation is modified from saturated compensating voltage dV_sat to semiconductor switching element voltage drop component dV_drop, and is added to the voltage command value for correction. Therefore, this system is regarded as being based on combination of conventional functions, where no new functional block is proposed.

As described above, categorization 1 contains three kinds: (a) System employing information of output electric current (command value or detection value), (b) System employing information of output voltage (command value or detection value), (c) System measuring switching delay time. Each kind is confronted by problems as follows.

(a) Problems about System Employing Information of Output Electric Current (Command Value or Detection Value)

As described above, in the system employing the electric current detection value, the ripple component of the electric current causes a disturbance, and the compensating voltage is delayed by a delay in detection. This time delay leaves a component that cannot compensate for the error voltage, and thereby causes a large distortion at or near the zero-crossing point of the current waveform.

On the other hand, the system employing the electric current command value causes no such time delay, but is confronted by a problem how to set a function of voltage correction (correction pattern) as shown in FIG. 16. Semiconductor switching elements have variation, and switching characteristics are varied by temperature variation. Therefore, in order to maintain preferable accuracy of compensation, it is required to implement some learning function, or combine a robust system such as a disturbance observer.

(b) Problems about System Employing Information of Output Voltage (Command Value or Detection Value)

Although omitted from the foregoing description of the prior art documents, there is another system which performs AD conversion of a voltage detection value for use in correction. This system is confronted by a problem how to extract a basic waveform component from a PWM pulse waveform. The PWM pulse waveform contains high-frequency harmonics so that it requires accurate filtering, high-speed AD converter, digital filtering after AD conversion, etc. The filter for removal of high-frequency harmonics causes a large delay time, and thereby causes a large current distortion as described about the system employing electric current detection value.

(c) Problems about System Employing Measurement of Switching Delay Time

This is a system that treats the output voltage as a PWM waveform by approximation to binarized value H/L (potential Vdc/0), and measures a switching delay time by a digital circuit. However, during approximation by binarization, it ignores a semiconductor switching element voltage drop component and others. Furthermore, for conversion from error time to voltage information, it requires measurement information of direct-current power supply voltage Vdc.

The switching delay time due to dead time is short, but measurement thereof requires at least a time period greater than the half cycle Tc/2 of the triangular wave carrier signal. Furthermore, correction of the voltage command value and PWM pulse width based on this measurement information, causes a further time delay. In this way, the system based on delay time measurement is also confronted by a problem that a control delay (dead time) until reflection of a compensating value is large. The control delay causes an electric current distortion significantly at or near the zero-crossing point of the electric current.

In this way, each system has some problem, and does not satisfy all of the requirements. In view of the foregoing, it is an object to suppress electric current distortion suitably in a controller for a power conversion circuit.

PRIOR ART DOCUMENT(S)

Patent Document(s)

Patent Document 1: JP S60-118082 A
Patent Document 2: JP H6-62580 A
Patent Document 3: JP H2-307369 A
Patent Document 4: JP 2012-16232 A
Patent Document 5: JP 2015-47021 A
Patent Document 6: JP 2001-352762 A
Patent Document 7: JP 2008-178159 A
Patent Document 8: JP 2012-44785 A
Patent Document 9: JP 2004-201414 A Non-Patent Document(s)

Non-Patent Document 1: Y. Murai; T. Watanabe; H. Iwasaki: "Waveform Distortion and Correction Circuit for PWM Inverters with Switching Lag-Times", IEEE Trans. on Industry Applications, IA-23, Issue: 5, p. 881-886 (1987)

SUMMARY

According to one aspect, it comprises: an electric current control section configured to output a voltage command value, based on a difference between an electric current command value and an electric current detection value; a PWM generation section configured to output a PWM command value, based on a triangular wave carrier signal and a corrected voltage command value, wherein the corrected voltage command value is a sum of the voltage command value and a combined compensating voltage component; a dead time adder configured to output a gate signal to a semiconductor switching element of a power conversion circuit by addition of a dead time to the PWM command value; a compensating voltage calculating section configured to calculate a compensating voltage component, based on the electric current command value; a first limiter configured to limit an absolute value of the compensating voltage component within a compensating voltage switching level; an electric potential binarization section configured to output a binarized digital value by binarization of a voltage detection value; a delay time measurement section configured to measure an ON-delay time and an OFF-delay time, based on the binarized digital value and the PWM command value; a multiplier configured to: calculate an error voltage component average value by multiplying an average value of the ON-delay time and the OFF-delay time by a value that is obtained by dividing a direct-current power supply voltage by a half cycle of the triangular wave carrier signal; and output the error voltage component average value; a second limiter configured to extract a component of the error voltage component average value that is beyond the compensating voltage switching level in absolute value; and an adder configured to: set the combined compensating voltage component to a sum of the limited compensating voltage component and the limited error voltage component; and output the combined compensating voltage component.

According to another aspect, it comprises: an electric current control section configured to output a voltage command value, based on a difference between an electric current command value and an electric current detection value; a PWM generation section configured to output a PWM command value, based on a triangular wave carrier signal and a corrected voltage command value, wherein the corrected voltage command value is a sum of the voltage command value and a combined compensating voltage component; a dead time adder configured to output a gate signal to a semiconductor switching element of a power conversion circuit by addition of a dead time to the PWM command value; a compensating voltage calculating section configured to calculate a compensating voltage component, based on the electric current command value; a first limiter configured to limit an absolute value of the compensating voltage component and within a sum of a voltage drop component of the semiconductor switching element and a compensating voltage switching level; an electric potential binarization section configured to output a binarized digital value by binarization of a voltage detection value; a delay time measurement section configured to measure an ON-delay time and an OFF-delay time, based on the binarized digital value and the PWM command value; a multiplier configured to: calculate an error voltage component average value by multiplying an average value of the ON-delay time and the OFF-delay time by a value that is obtained by dividing a direct-current power supply voltage by a half cycle of the triangular wave carrier signal; and output the error voltage component average value; a second limiter configured to extract a component of the error voltage component average value that is beyond the compensating voltage switching level in absolute value; and an adder configured to: set the combined compensating voltage component to a sum of the limited compensating voltage component and the limited error voltage component; and output the combined compensating voltage component.

According to one aspect of the foregoing, the compensating voltage switching level is adjusted depending on a state of operation of the power conversion circuit.

According to the present disclosure, it is possible to suppress electric current distortion in the controller for the power conversion circuit.

BRIEF DESCRIPTION OF THE DRAWINGS

FIG. 4 is expanded in time.

FIG. 6 is expanded in time.

FIG. 8 is expanded in time.

FIG. 10 is expanded in time.

DETAILED DESCRIPTION

One or more embodiments is implemented by a combination of a compensating system based on electric current command value with a small time delay for a condition where a change of error voltage is large at or near a zero-crossing point, and a compensating system based on delay time measurement which is relatively accurate for a steady-state condition after an electric current has reached a certain level of amplitude.

The following details power conversion circuit controllers according to first and second embodiments with reference to FIGS. 1 to 13.

First Embodiment

Figure 1:
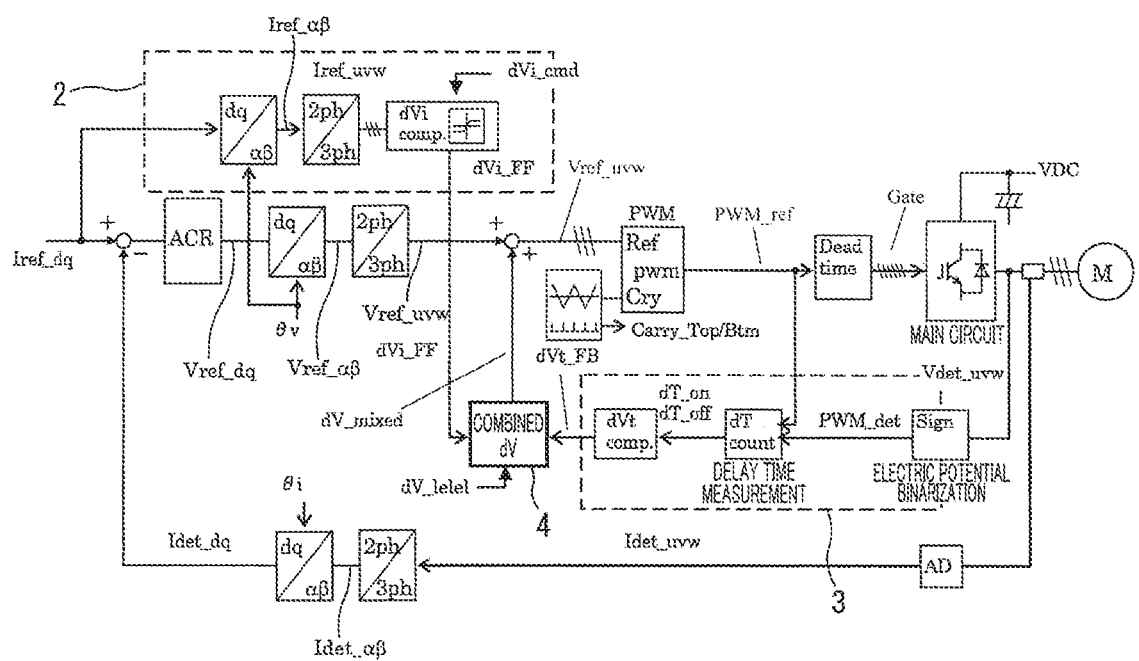
FIG. 1 is a block diagram showing a control function of a power conversion circuit according to a first embodiment.
Figure 15:
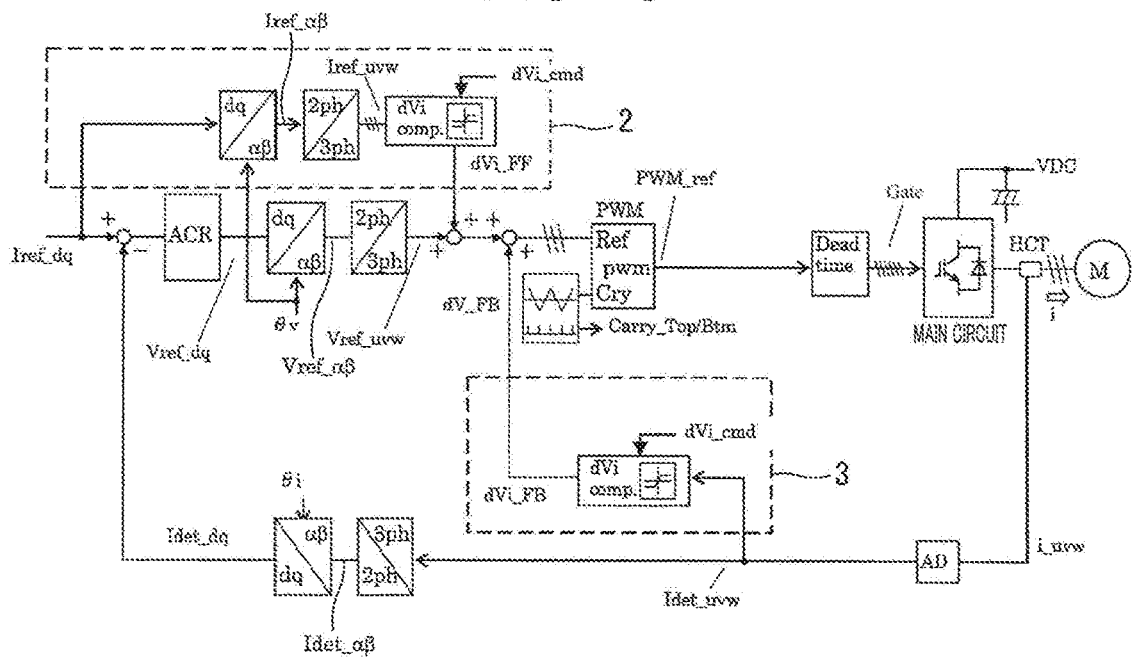
FIG. 15 is a block diagram showing a conventional example of dead time compensation system based on electric current.
Figure 18:
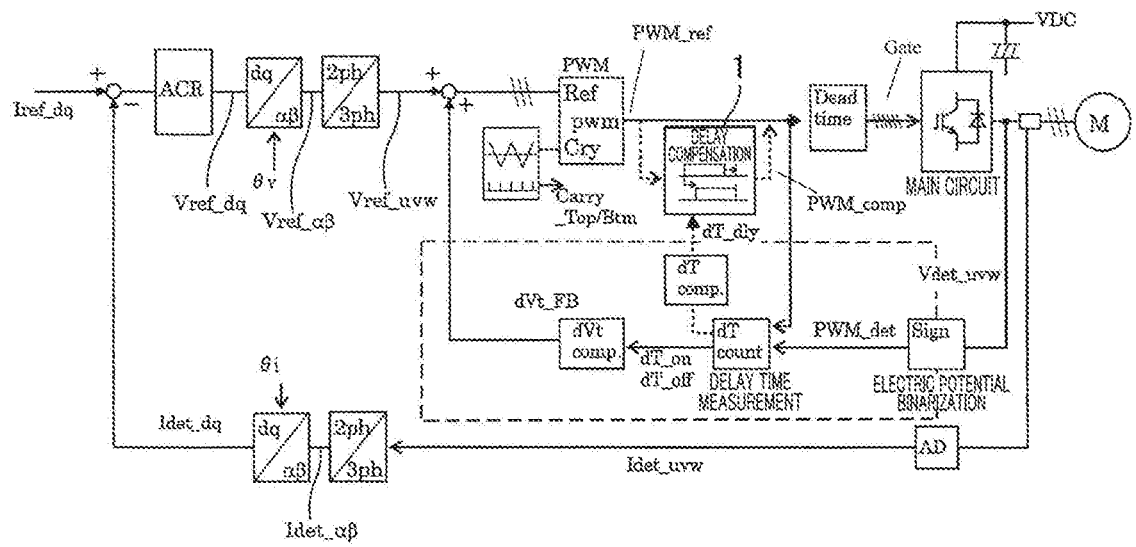
FIG. 18 is a block diagram showing a conventional example of dead time compensation system based on voltage detection.
Figure 19:
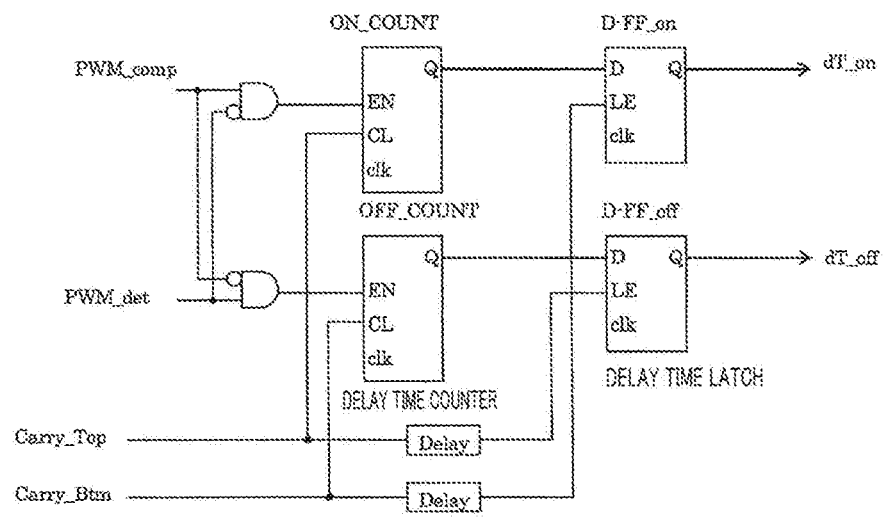
FIG. 19 is a block diagram showing a delay time measurement section of FIG. 18.
Figure 20:
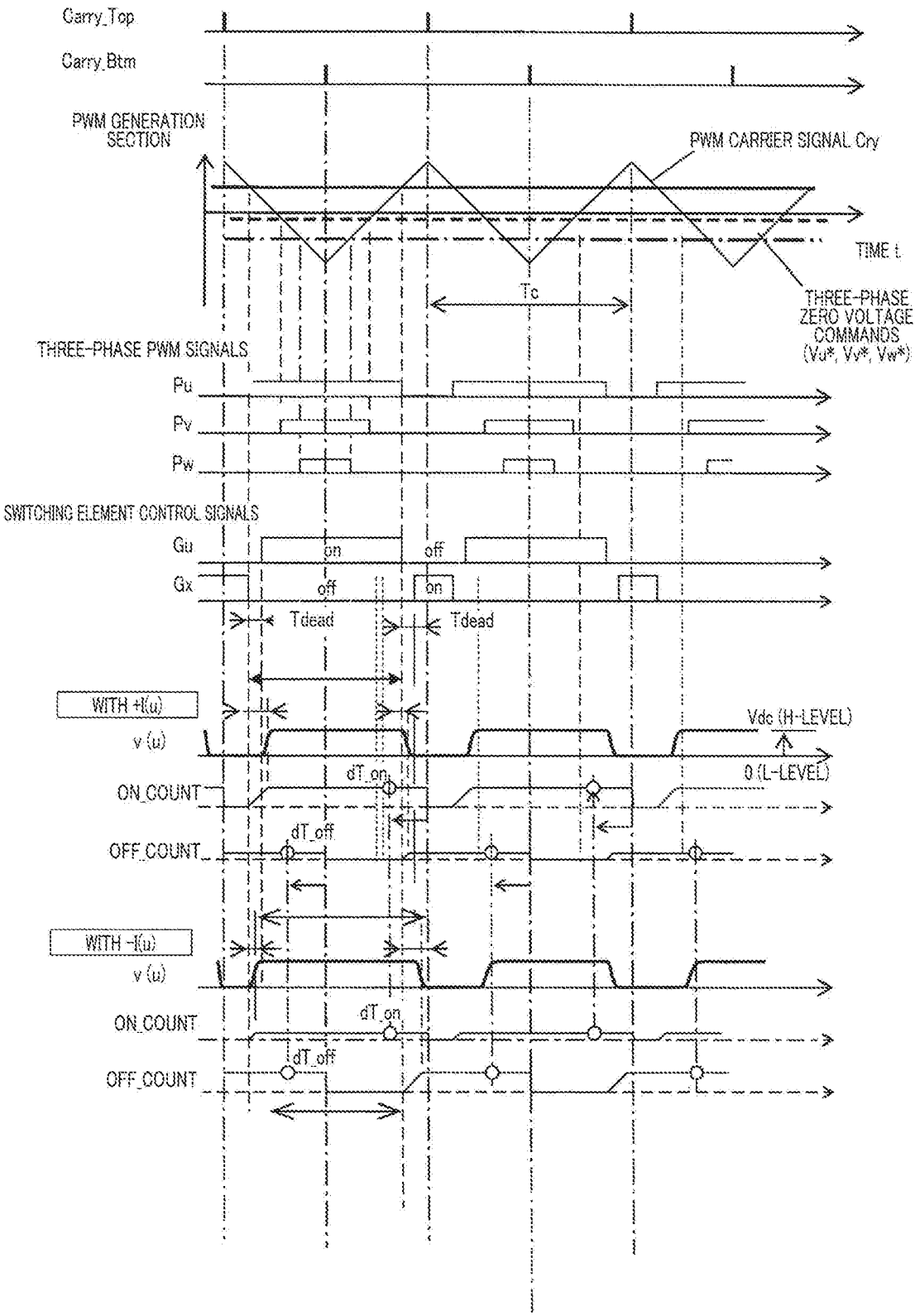
FIG. 20 is a timing chart showing behavior of a PWM-generation section PWM, a dead time adder Deadtime, and a delay time measurement section.

FIG. 1 is a diagram showing a controller of a power conversion circuit according to the first embodiment. Elements common with FIG. 15 or FIG. 18 are given the same symbols, and detailed description thereof is omitted. This employs the "compensating system based on electric current command value" 2 shown in FIG. 15, and electric potential binarization section Sign, delay time measurement section dTcount, and unit converter dVtcomp which correspond to FIG. 18 of patent document 4. These pieces of information about compensation are combined together at a combination block 4, to generate combined compensating voltage component dV_mixed, which is added as a quantity of correction to a voltage command value to generate corrected voltage command value Vref_uvw.

Figure 2:
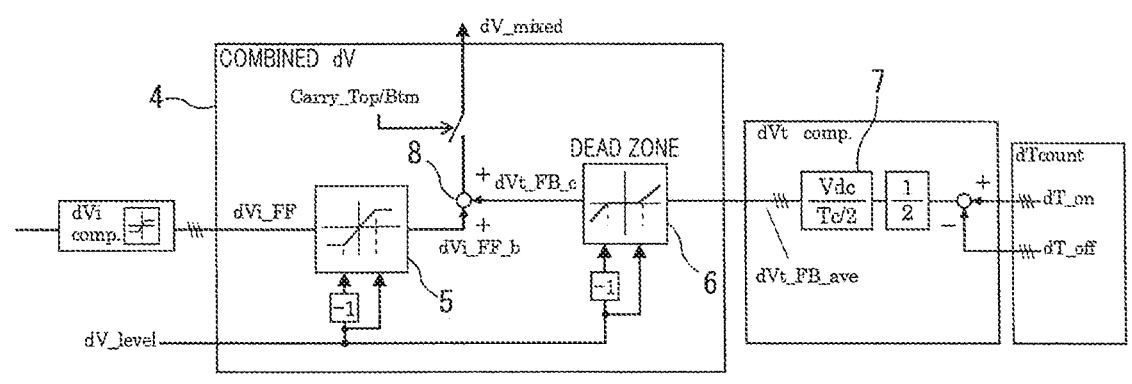
FIG. 2 is a block diagram showing a combination block according to the first embodiment.

FIG. 2 shows an example of specific configuration of combination block 4 and unit converter dVtcomp upstream of combination block 4. It is to be noted in FIG. 2 that compensating voltage switching level dV_level is newly set for combination of two kinds of compensating components based on different pieces of information.

Compensating voltage component dVi_FF based on electric current command value is limited by a first limiter 5 having a property of saturation, such that the absolute value of compensating voltage component dVi_FF is within compensating voltage switching level dV_level, thereby producing limited compensating voltage component dVi_FF_b.

On the other hand, with regard to compensation based on delay time measurement value, for conversion into a voltage command value component, OFF-delay time dT_off is first subtracted from ON-delay time dT_on, and the obtained value is multiplied by ½, thereby calculating an average value. Thereafter, at a multiplier 7, the average value is multiplied by a conversion factor from time to voltage Vdc/(Tc/2) (a value obtained by dividing the direct-current power supply voltage by the half cycle of the triangular wave carrier signal), to obtain error voltage component average value dVt_FB_ave. Then, through a second limiter 6 provided with a dead zone whose level is set, only a component beyond compensating voltage switching level ±dV_level in absolute value is extracted as limited error voltage component dV_FB_c.

These two kinds of output from first limiter 5 and second limiter 6, namely, limited compensating voltage component dVi_FF_b and limited error voltage component dVt_FB_c, are added together at an adder 8, to generate a new combined compensating voltage component dV_mixed.

For synchronization of the compensating voltage with the half cycle Tc/2 of triangular wave carrier signal Cry, sampling is performed in response to trigger signal Carry_Top at the upper peak time instant and trigger signal Carry_Btm at the lower peak time instant of triangular wave carrier signal Cry. This sampler may be positioned at a more upstream position, and may be divided into a part for OFF-delay time dT_off and ON-delay time dT_on, and a part of compensating voltage component dVi_FF, for equivalent behavior.

In this way, in order to combine or mix two kinds of characteristic compensating information while maintaining advantages of both, the first embodiment is configured to extract an inside component and an outside component with respect to compensating voltage width (compensating voltage switching level) ±dV_level, and then combine the extracted components again.

FIG. 3 shows a relationship among the U-phase current waveform, ON-delay time dT_on, and OFF-delay time dT_off. In FIG. 3A, a broken line represents the U-phase component of the electric current command of the electric current control Iref(u), whereas a solid line represents the electric current output value i(u) that follows the electric current command value Iref(u) with a small delay due to a delay of response of the electric current control.

Figure 3A:
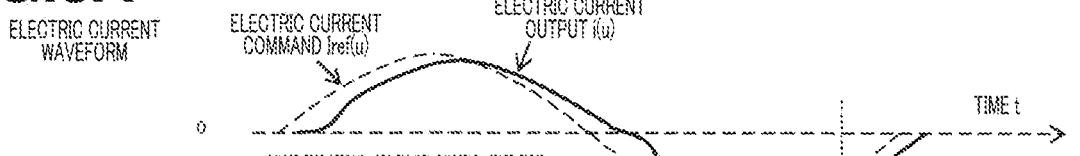
FIG. 3 is a timing chart illustrating behavior of the first embodiment.
Figure 3C:
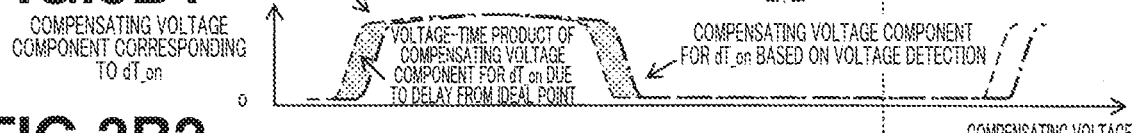
Figure 3C:
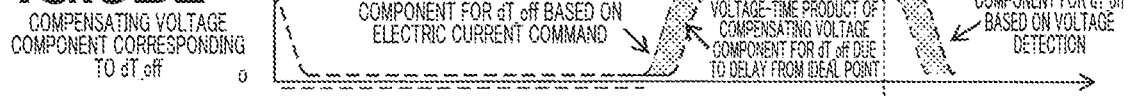
Figure 3C:
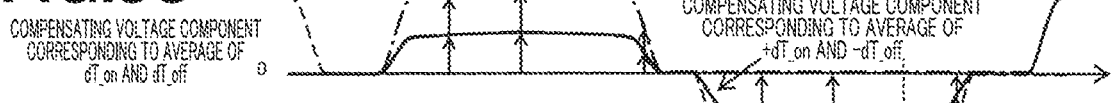

In case that electric current output value i(u) has a waveform as indicated by the solid line in FIG. 3A, ON-delay time dT_on changes as indicated by a chain line in FIG. 3B1, and OFF-delay time dT_off changes as indicated by a broken line FIG. 3B2. In this way, the generated amount of delay time for each half-wave cycle varies, depending on the electric current polarity.

Of the two kinds of delay times, ON-delay time dT_on causes an error voltage that causes a decrease in the output voltage, and OFF-delay time dT_off causes an error voltage that causes an increase in the output voltage.

Accordingly, compensation for ON-delay time dT_on requires a positive compensating voltage, and compensation for OFF-delay time dT_off requires a negative compensating voltage, so that an average of ON-delay time dT_on as a positive value and OFF-delay time dT_off as a negative value is calculated and converted into a compensating component, as shown in FIG. 2.

Addition of a negative value and a positive value is equivalent to subtracting operation. Multiplying a chain line and a broken line in FIG. 3C by ½, yields a compensating voltage component corresponding to the average of ON-delay time dT_on and OFF-delay time dT_off as indicated by a solid line. Multiplying by Vdc/(Tc/2) for conversion to voltage, yields a waveform of error voltage component average value dVt_FB_ave as shown in FIG. 3D.

Figure 16:
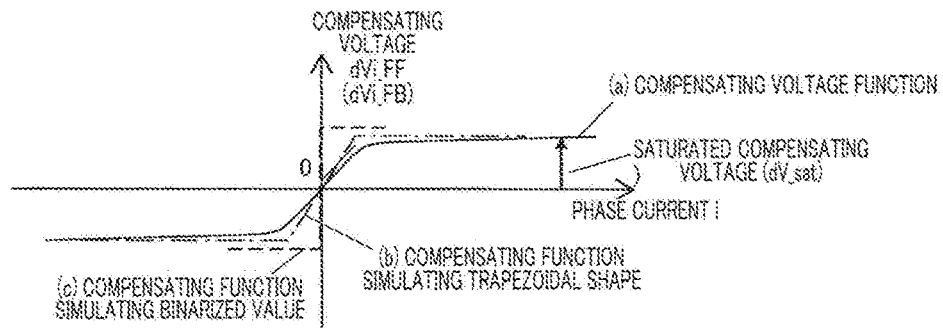
FIG. 16 is a diagram showing a function between electric current waveform and compensating voltage component.

Compensating voltage switching level dV_level is set to a setpoint slightly smaller than the amplitude of compensating voltage component dVi_FF based on electric current command value (normally, dV_sat in FIG. 16).

Figure 3D:

The second limiter 6 shown in FIG. 2 extracts a component beyond the width of compensating voltage switching level ±dV_level, and thereby outputs limited error voltage component dVt_FB_c that includes only both end portions indicated by hatching pattern in FIG. 3D, wherein an inside portion within the width of compensating voltage switching level ±dV_level is removed.

Figure 3E:
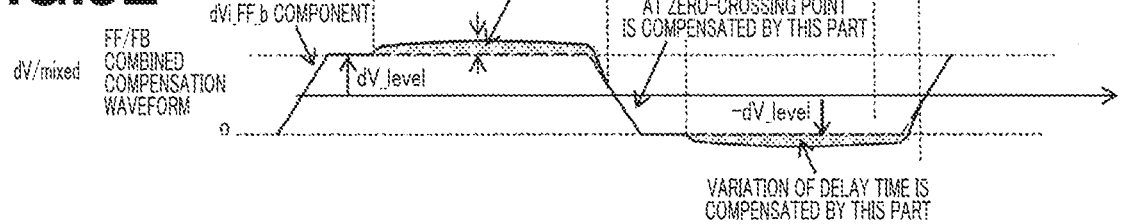
Figure 17:
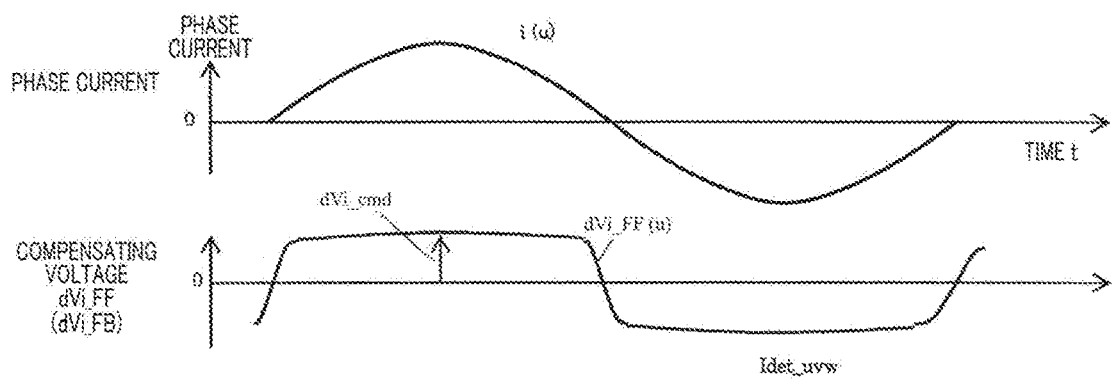
FIG. 17 is a time chart showing an electric current waveform and a compensating voltage component waveform with respect to time.

FIG. 3E shows that limited compensating voltage component dVi_FF_b obtained by limitation of compensating voltage component dVi_FF of FIG. 17 by the first limiter 5, and limited error voltage component dVt_FB_c described above are added together, to obtain a final compensating voltage component. Limited compensating voltage component dVi_FF_b has a trapezoidal waveform that is generated based on electric current command value Iref(u) and therefore has no time delay with respect to timing of the zero-crossing point of electric current output value i(u).

Namely, FIG. 3E shows combination of two different kinds of components, i.e. limited compensating voltage component dVi_FF_b, which is obtained by limitation within the width of compensating voltage switching level ±dV_level, and has no time delay because it is based on the electric current command value, and limited error voltage component dVt_FB_c, which is beyond the width of compensating voltage switching level ±dV_level, and has a time delay because it is based on the actual electric current.

According to the first embodiment, by combining two kinds of compensating actions as shown in FIG. 3E, the use of limited compensating voltage component dVi_FF_b having no time delay serves to suppress electric current distortion at or near the zero-crossing point of the electric current, against the problem of time delay about the error voltage due to the dead time, wherein the error voltage is a factor of the electric current distortion.

The other problem is that although compensating voltage command value dVi_cmd set for generation of compensating voltage component dVi_FF should be set to saturated compensating voltage dV_sat shown in FIG. 16, an error occurs due to variation of characteristics of semiconductor switching elements and temperature variation. Accordingly, compensating voltage switching level dV_level for the first limiter 5 and second limiter 6 is set to a setpoint slightly smaller than the current compensation command value (dVi_cmd≈dvi_sat) by an assumed amount of variation. In this way, the minimum compensating voltage is thus ensured for variation.

For the component of variation, limited error voltage component dVt_FB_c based on the measured delay time is added to the voltage command value, for ensuring the accuracy of compensation.

As shown in FIGS. 3B1 and 3B2, the detection values of ON-delay time dT_on and OFF-delay time dT_off are obtained at more delayed timings than when the electric current flows in accordance with an ideal electric current command, wherein the difference between this ideal waveform and the measured waveform is an error in the quantity of compensation. The error is large in a region where the gradient with respect to time is large, namely, in a region within the width of compensating voltage switching level dV_level. On the other hand, in a region where the gradient with respect to time is small, namely, in a region beyond the width of compensating voltage switching level dV_level, electric current distortion is unlikely to occur, because the error in the quantity of compensation is small even with the same delay time.

These characteristics are used by the present system, in which electric current distortion is suppressed by combination of only advantageous parts of two kinds of compensating systems.

FIGS. 4 to 11 show specific examples of waveforms for comparison of characteristics, which are obtained by numerical simulation. The four examples of waveforms are obtained under the following conditions.

Figure 4:
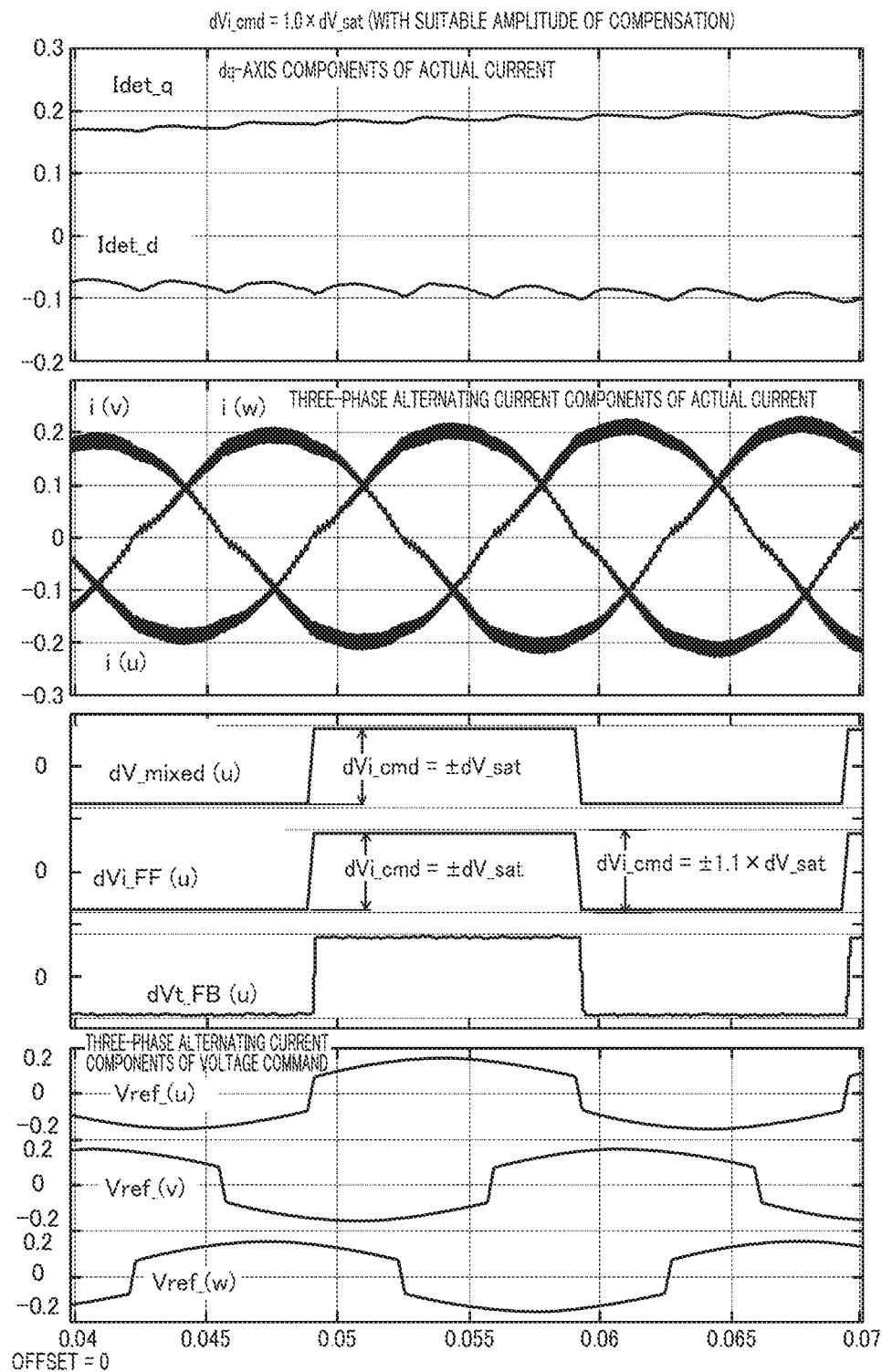
FIG. 4 is a time chart showing an example of simulated behavior of a dead time compensation system based on electric current (dVi_comd=1.0×dV_sat).
Figure 5:
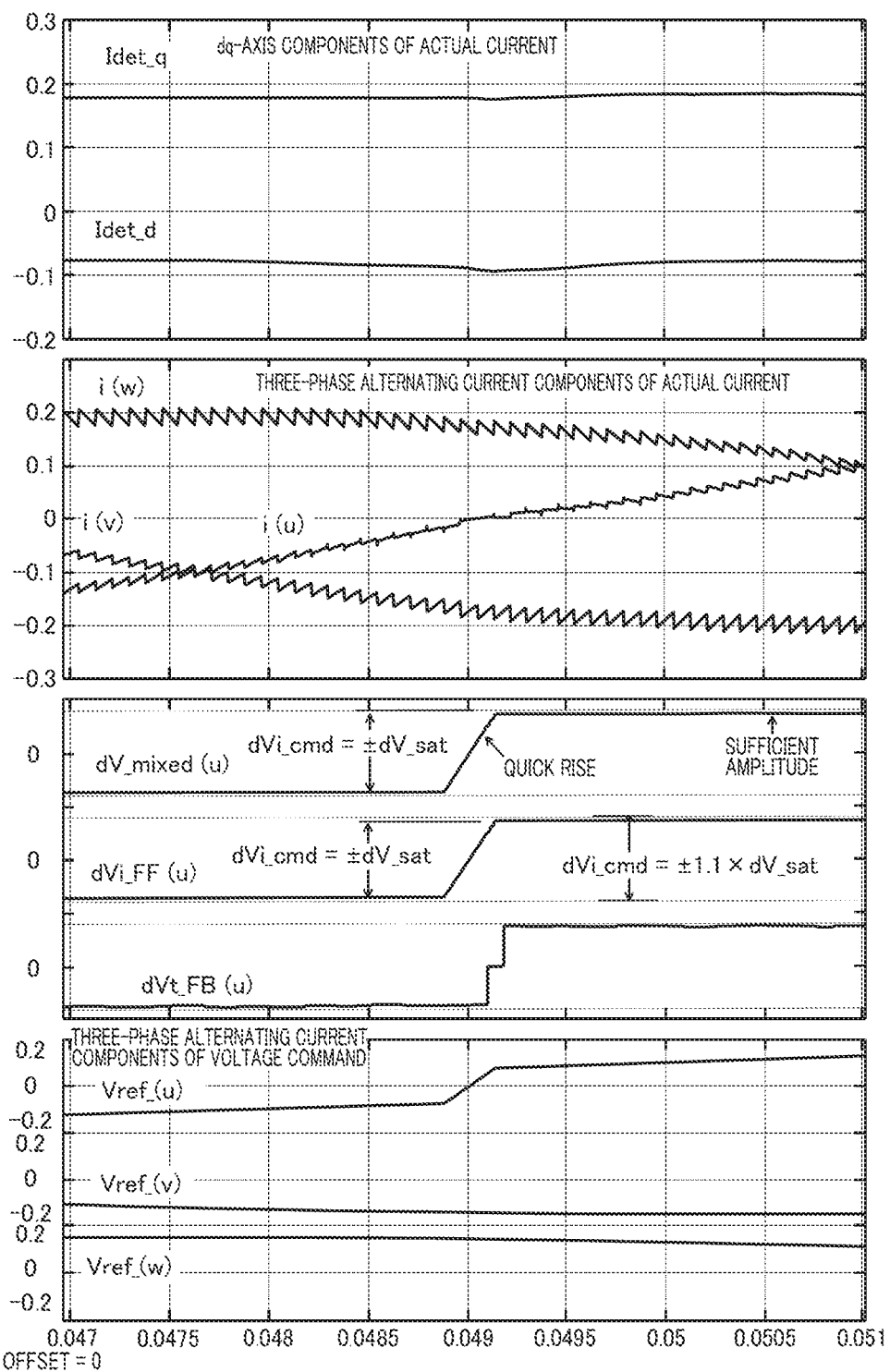
FIG. 5 is a diagram where

FIGS. 4 and 5 are time charts showing an example of simulated behavior of the dead time compensation system based on electric current (FIG. 15), with dVi_cmd=1.0× dV_sat (with suitable amplitude of compensation), and dV_level=1.1×dV_sat (correction based on delay time measurement is forced to be zero).

Figure 6:
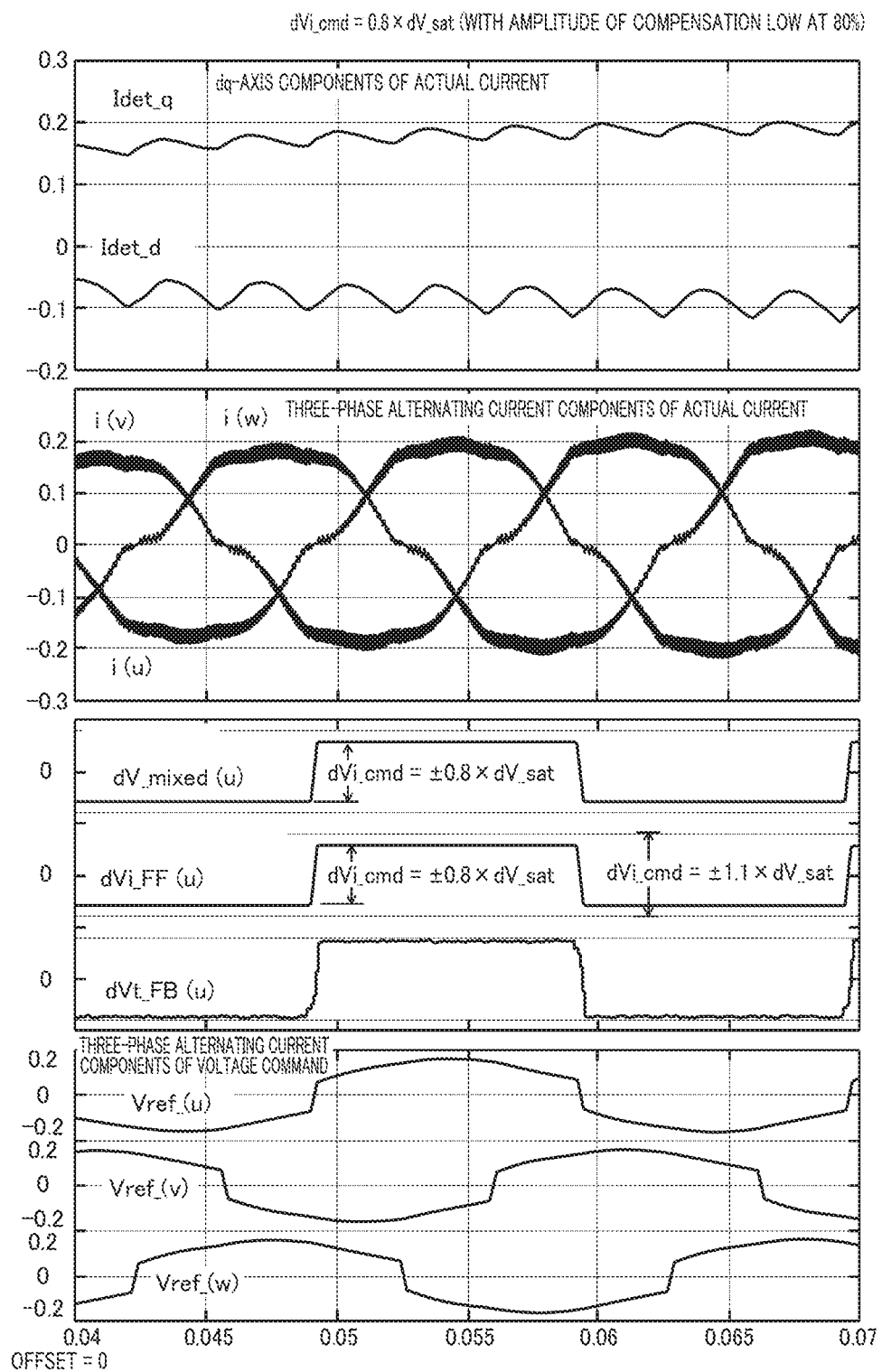
FIG. 6 is a time chart showing an example of simulated behavior of a dead time compensation system based on electric current (dVi_comd=0.8×dV_sat).
Figure 7:
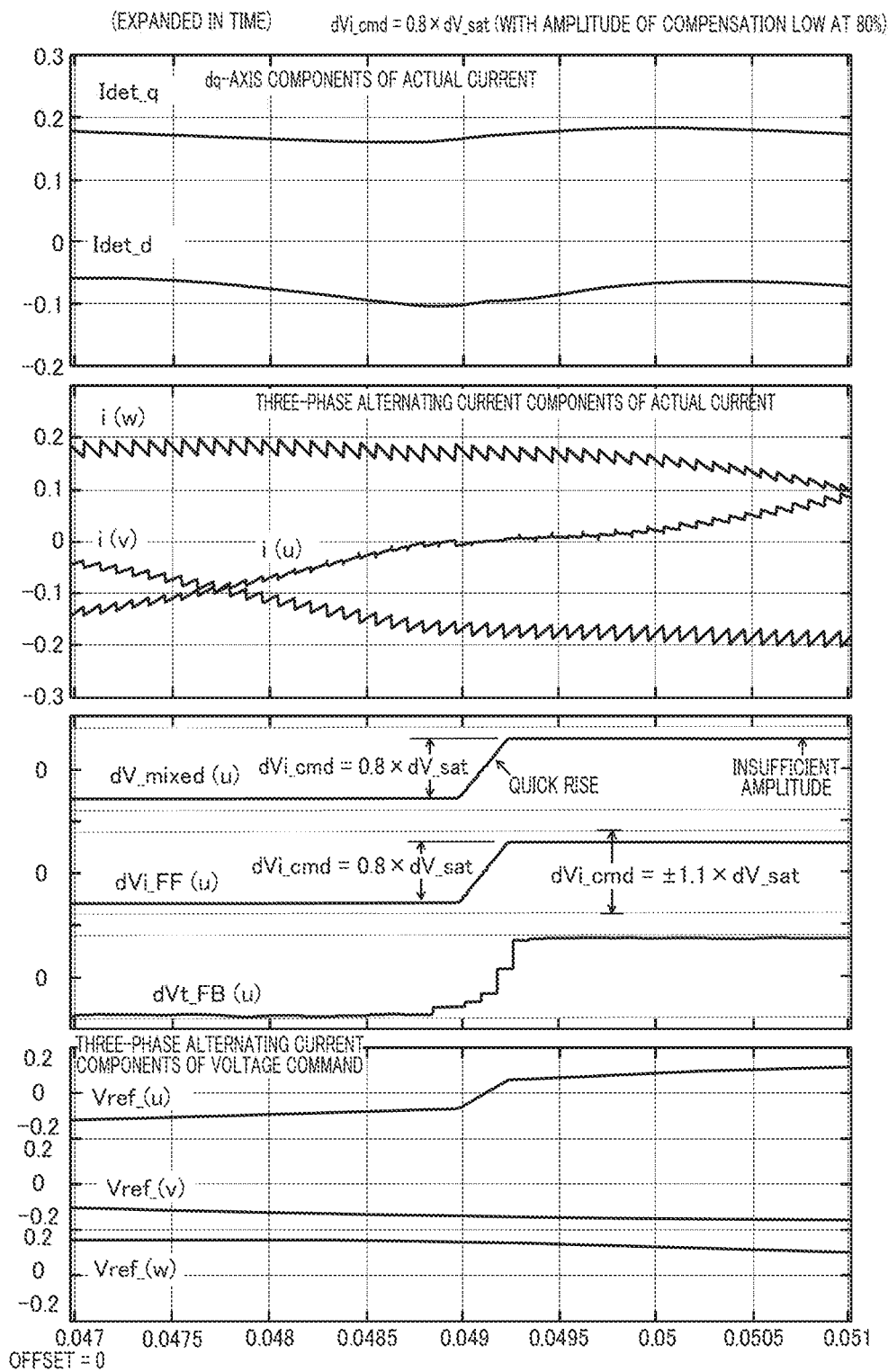
FIG. 7 is a diagram where

FIGS. 6 and 7 are time charts showing an example of simulated behavior of the dead time compensation system based on electric current (FIG. 15), with dVi_cmd=0.8× dV_sat (with amplitude of compensation small at 80%), and dV_level=1.1×dV_sat (correction based on delay time measurement is forced to be zero).

Figure 8:
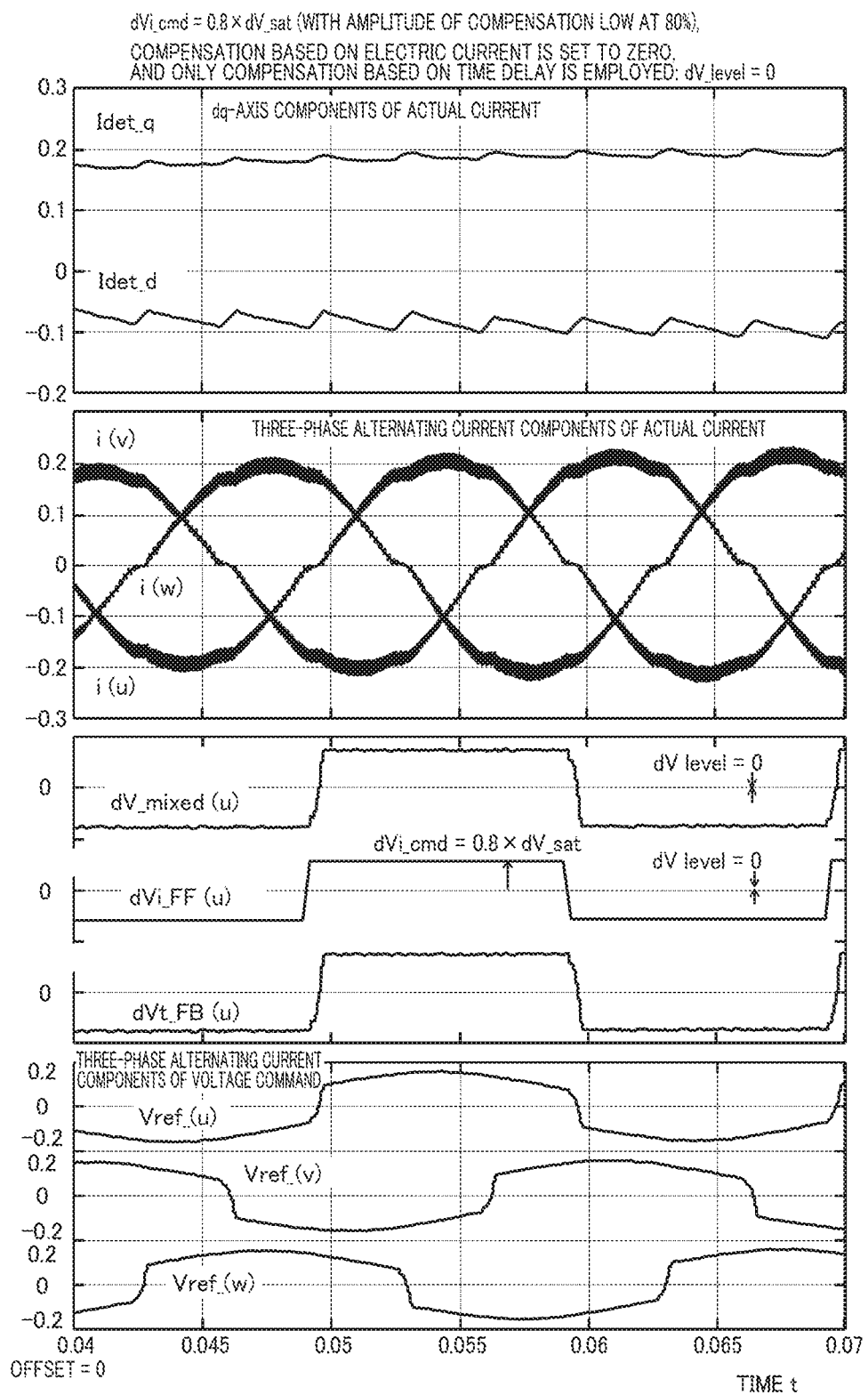
FIG. 8 is a time chart showing an example of simulated behavior of a dead time compensation system based on voltage detection (dVi_comd=0.8×dV_sat).
Figure 9:
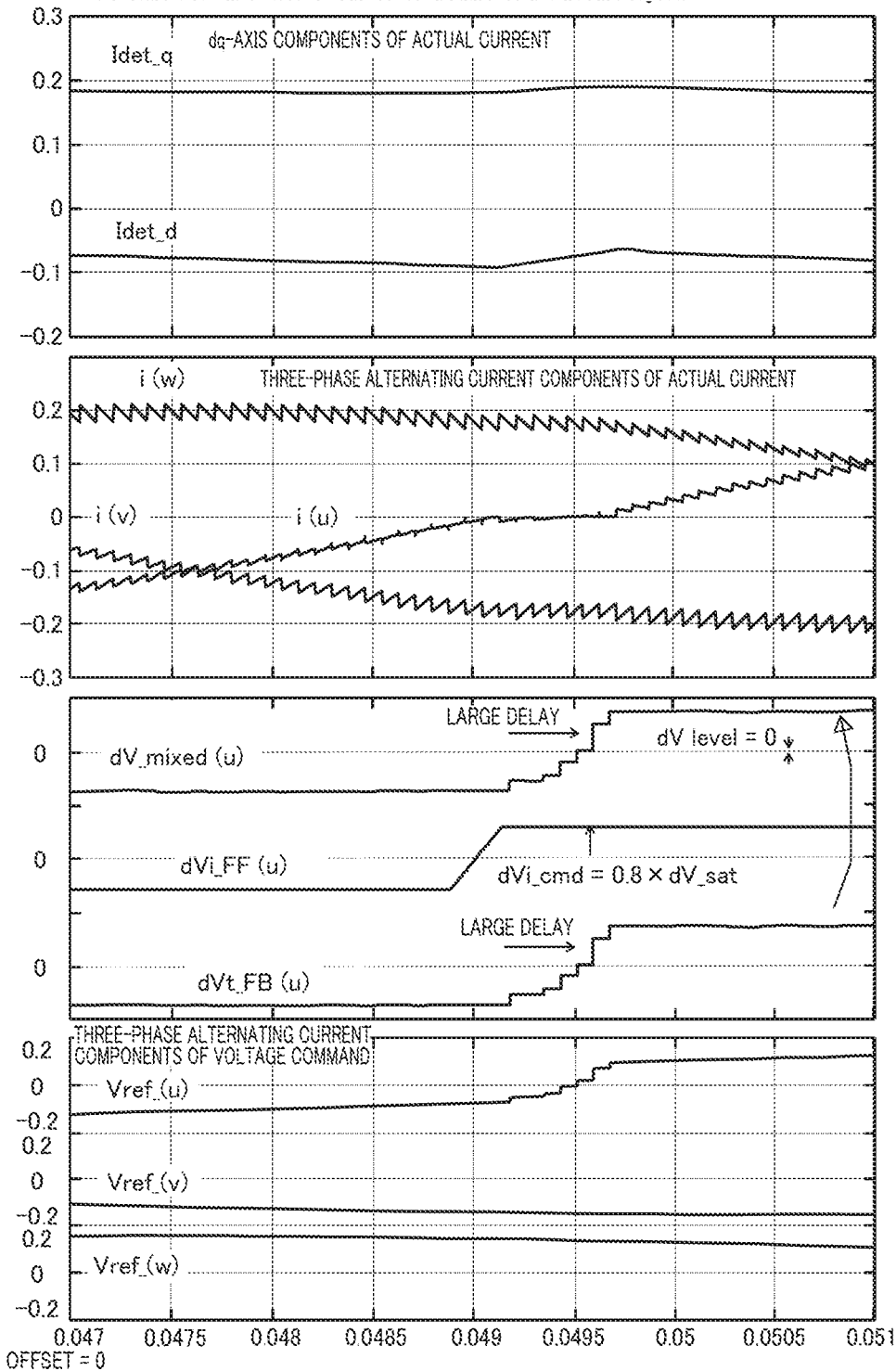
FIG. 9 is a diagram where

FIGS. 8 and 9 are time charts showing an example of simulated behavior of the dead time compensation system based on voltage detection (FIG. 18), with dVi_cmd=0.8× dV_sat (with amplitude of compensation small at 80%), and dV_level=0 (compensation based on electric current is forced to be zero, and only compensation based on time delay is activated).

Figure 10:
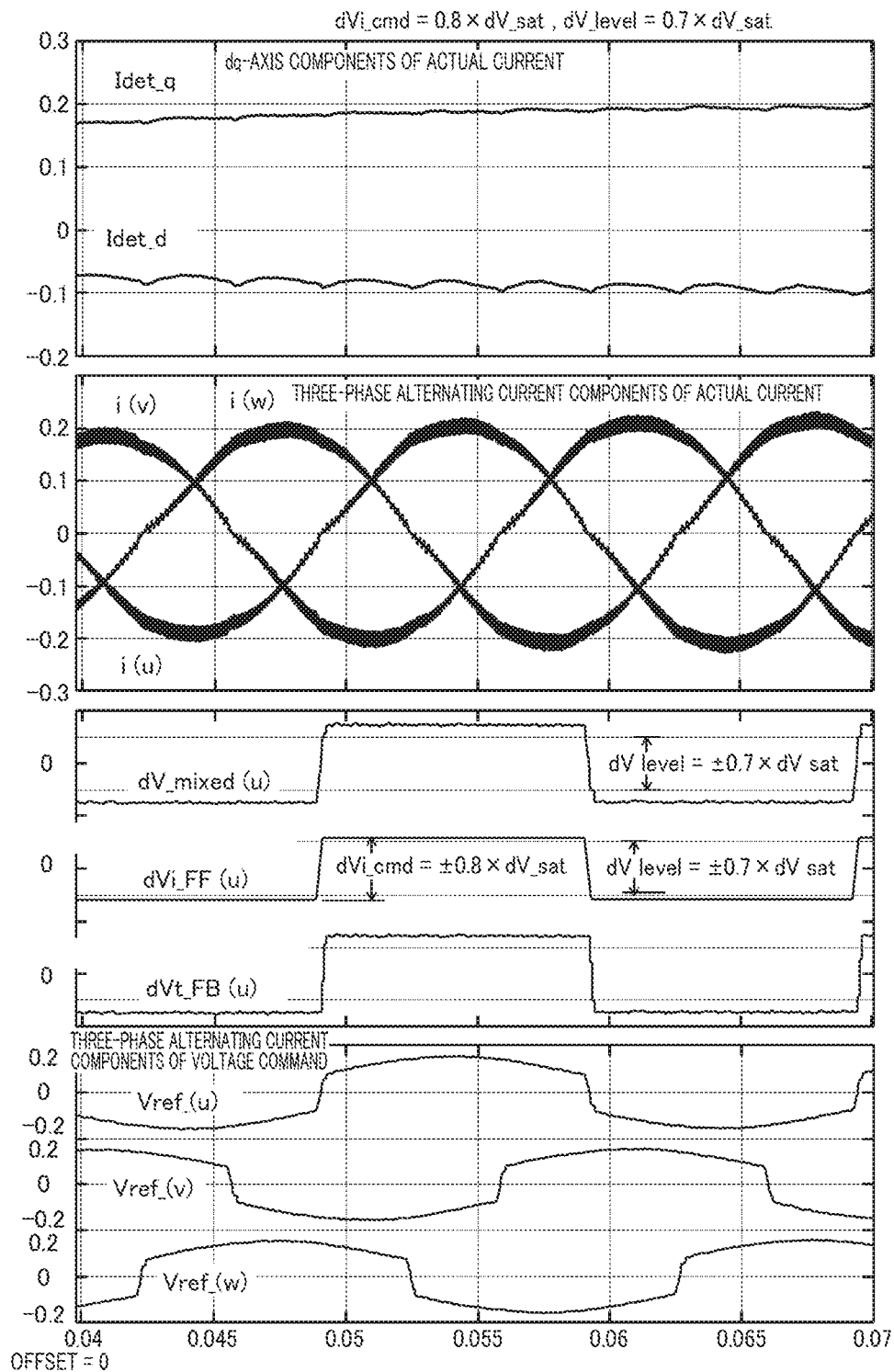
FIG. 10 is a time chart showing an example of simulated behavior of a dead time compensation system according to the first embodiment (dVi_comd=0.8×dV_sat, dV_level=0.7×dV_sat).
Figure 11:
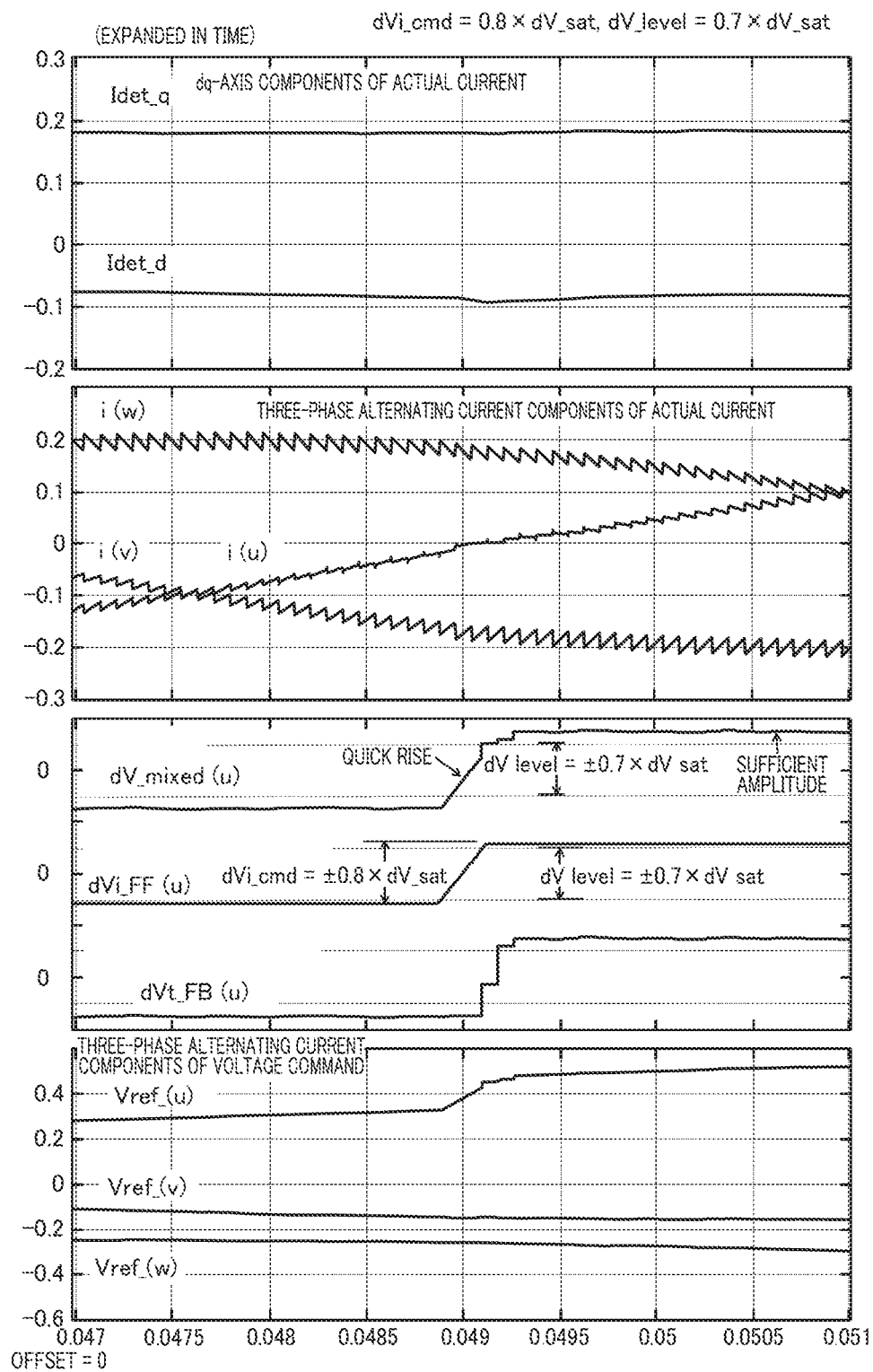
FIG. 11 is a diagram where

FIGS. 10 and 11 are time charts showing an example of simulated behavior of the combined dead time compensation system according to the first embodiment based on both of voltage command value and voltage detection value, with dVi_cmd=0.8×dV_sat (with amplitude of compensation small at 80%), and dV_level=0.7×dV_sat (two kinds of compensating quantities are separated at this level and rejoined together).

With a large electric current distortion, it is easy to recognize an improvement. Therefore, the frequency is set low at about ⅙ of the nominal value, and the electric current amplitude is set small at about 20%. The responsiveness of the electric current control is set low at about 1000 rad/s. FIGS. 4, 6, 8, and 10 show waveforms during two cycles, and FIGS. 5, 7, 9, and 11 show waveforms expanded in time.

Each chart shows four waveforms in four rows. The first row shows components of two-phase electric current detection value Idet_dq which is to be employed by the electric current control, and obtained by transforming the three-phase electric current detection values after removal of PWM ripples into the orthogonal axes (dq-axes) of the rotating coordinate system. The distortion causes a relatively large effect especially on the d-axis waveform Idet_d.

The second row shows three-phase electric current output values i(u), i(v), i(w), wherein large distortion occurs at or near the zero-crossing point. These waveforms are actual, and contain PWM ripple components.

The third row sows three kinds of components shown in FIG. 2 only with attention to the U-phase. The upper part shows combined compensating voltage component dV_mixed, the middle part shows compensating voltage component dVi_FF based on electric current command value, and the lower part shows error voltage component dVt_FB based on delay time measurement. Combined compensating voltage component dV_mixed is created from the lower two kinds of waveforms, depending on the setting of compensating voltage switching level dV_level, wherein compensating voltage switching levels ±dV_level are indicated by dotted lines.

The fourth row shows three-phase alternating current components, namely, corrected voltage command values Vref(u), Vref(v), Vref(w) after addition of combined compensating voltage component dV_mixed. The sinewave voltage is outputted by the electric current control, and the trapezoidal compensating voltage is added to the sinewave voltage for compensation for the dead time.

Of the four sets of waveforms shown in FIGS. 4 to 11, the set of waveforms of FIGS. 4 and 5 is made by an ideal compensating operation, and is regarded as a target to be achieved by the first embodiment.

FIGS. 6 and 7 also show the compensating system only based on electric current command value, but the compensating quantity is set small as dVi_cmd=0.8×dV_sat (with amplitude of compensation small at 80%), which causes a compensation error component, and causes electric current distortion. FIGS. 8 and 9 show the system employing only the compensation quantity based on delay time measurement, which also shows a large electric current distortion.

Finally, FIGS. 10 and 11 show the first embodiment, wherein the amplitude of the compensating quantity based on electric current command value is set as dVi_cmd=0.8× dV_sat similar to FIGS. 6 and 7 for allowing a compensation error to occur, and the compensating voltage switching level is set slightly lower than the amplitude of compensation based on the electric current command value as dV_level=0.7×dV_sat.

As a result, the first embodiment obtains similar electric current waveforms as in FIGS. 4 and 5. It has been confirmed that electric current distortion is suppressed by accurate compensation for voltage error due to dead time. Different characteristics of compensation are clearly shown by comparison among the third rows of the four charts expanded in time (FIGS. 5, 7, 9, and 11).

FIG. 5 shows an example of correction based on ideal electric current command, wherein actual electric current distortion is small so that the time delay of the compensating component based on delay time measurement is small.

However, in FIG. 7, the amplitude of compensating voltage is short although the delay time is the same as in FIG. 5. This causes an electric current distortion, and changes the waveform of the compensating component based on the delay time measurement.

In FIG. 9, the compensating component based on delay time measurement with large time delay is used so that the electric current waveform distortion is large, and this further increases the time delay of the compensating component based on delay time measurement.

In FIG. 11, the generated compensating voltage is similar to FIG. 5, but is different only in the part beyond compensating voltage switching level dV_level where detection delay occurs. However, the time period when the delay has an effect is short, and this delay is not a factor of causing electric current distortion.

Furthermore, in the configuration of FIG. 2, it is possible to vary the compensating voltage switching level dV_level continuously, and adjust and increase the ratio of the compensating component based on delay time measurement by reducing the compensating voltage switching level dV_level, if the electric current polarity cannot be estimated accurately because the amplitude of the electric current is too small. In other words, the flexibility is enhanced by provision of adjustment of the compensating voltage switching level dV_level depending on the state of operation of the power conversion circuit.

There is a system implementing a function similar to the foregoing by correcting a relationship between electric current and compensating voltage by a learning function. However, the learning function may be unable to follow a rapid change of the amplitude of the electric current, for example, when a rapid change occurs between light load and heavy load. In contrast, the system according to the first embodiment causes no large following delay as caused by learning, because the detection value is used directly as the correction value. Furthermore, it is unnecessary to set a model, wherein model setting is a problem in case of an estimation observer for disturbance voltage.

Second Embodiment

Figure 12:
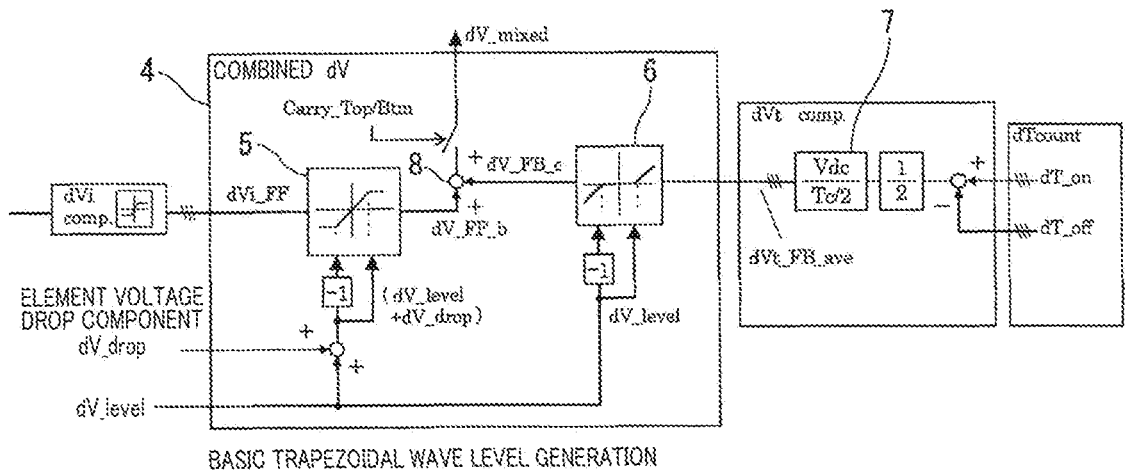
FIG. 12 is a block diagram showing a combination block according to a second embodiment.
Figure 13:
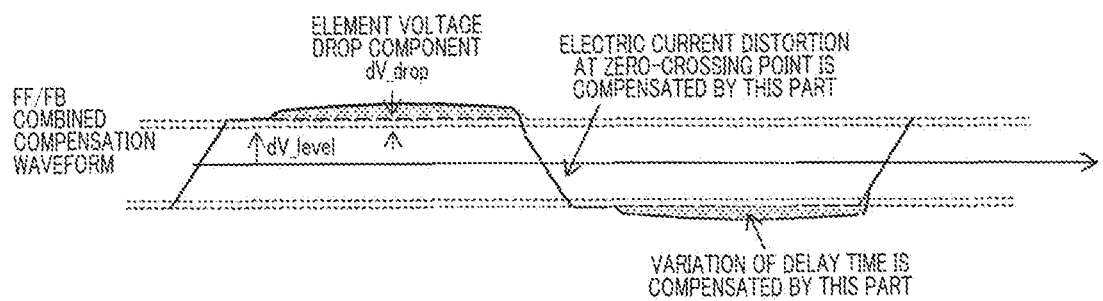
FIG. 13 is a timing chart illustrating behavior of the second embodiment.
Figure 14:
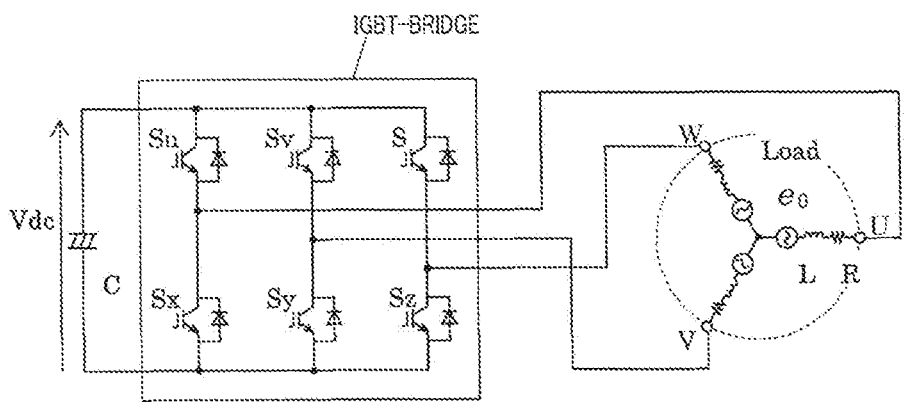
FIG. 14 is a configuration diagram showing an example of three-phase voltage source inverter.

The second embodiment employs the same configuration of FIG. 1 as the first embodiment, wherein the configuration of FIG. 2 is replaced with configuration of FIG. 12. The difference between FIG. 2 and FIG. 12 is that the setpoint of the first limiter 5 for limiting the compensating voltage component dVi_FF based on electric current command value is corrected and set to a sum of compensating voltage switching level dV_level and semiconductor switching element voltage drop component dV_drop. Namely, the first limiter 5 performs limitation within ±(dV_level+dV_drop).

On the other hand, the level of the second limiter 6, which has a dead zone function, and extracts the excess part of the compensating quantity based on time delay measurement, is the same as in the first embodiment.

The configuration that the level of the first limiter 5 and the level of the second limiter 6 are set different, serves to compensate also for the semiconductor switching element voltage drop component as discussed about Categorization 4 (b).

The second embodiment behaves in substantially the same manner as the first embodiment, but the configuration that the range of compensating voltage component dVi_FF_b based on electric current command with no time delay is modified from the width of ±dV_level to the width of ±(dV_level+dV_drop)≈±(dV_sat+dV_drop), serves widening by the voltage drop component. This serves to compensate for the semiconductor switching element voltage drop component depending on the electric current polarity.

With regard to error voltage component dVt_FB_c, it is not required to compensate for semiconductor switching element voltage drop component dV_drop, because semiconductor switching element voltage drop component dV_drop is ignored at the binarization of the output voltage.

The error voltage of a PWM inverter contains a component resulting from a dead time, and a component resulting from semiconductor switching element voltage drop component dV_drop. According to the system of the first embodiment, when the output voltage is binarized and converted into error voltage component dVt_FB, semiconductor switching element voltage drop component dV_drop is ignored so that there is no effect of compensation for the error voltage resulting from semiconductor switching element voltage drop component V_drop.

In the second embodiment, compensating voltage component dVi_FF_b based on electric current command is provided with the function of compensating for semiconductor switching element voltage drop component dV_drop. This serves to compensate not only for the error voltage due to dead time, but also for the error component due to the voltage drop of the semiconductor switching element.

The characteristics of semiconductor switching element voltage drop component dV_drop are similar to those of the error voltage resulting from the dead time, wherein voltage drop component dV_drop varies depending on the electric current polarity, and the error voltage has saturation. Accordingly, only by increasing the limitation level of compensating voltage component dVi_FF to ±(dV_level+dV_drop)≈±(dV_sat+dV_drop) by the voltage drop component, the effect of compensation for voltage drop component dV_drop is added to limited compensating voltage component dVi_FF_b.

The second embodiment serves to compensate for the error voltage resulting not only from the dead time but also from semiconductor switching element voltage drop component dV_drop, and thereby output a more accurate PWM voltage. This serves to further suppress the disturbance voltage of the electric current control, and thereby suppress distortion of the electric current waveform.

Although the present disclosure is described in detail only with reference to the specific embodiments, those may be changed or modified variously within the scope of technical conception of the present disclosure, as is clear to the skilled person. Naturally, such changes and modifications belong to the scope defined by the claims.

The present disclosure may be applied to power conversion devices other than inverters for motor driving. For example, this art may be applied to PWM converters for conversion from alternating current system electric power to direct current electric power.

The invention claimed is:
1. A controller for a power conversion circuit, comprising:
an electric current control section configured to output a voltage command value, based on a difference between an electric current command value and an electric current detection value;
a PWM generation section configured to output a PWM command value, based on a triangular wave carrier signal and a corrected voltage command value, wherein the corrected voltage command value is a sum of the voltage command value and a combined compensating voltage component;

a dead time adder configured to output a gate signal to a semiconductor switching element of the power conversion circuit by addition of a dead time to the PWM command value;

a compensating voltage calculating section configured to calculate a compensating voltage component, based on the electric current command value;

a first limiter configured to limit an absolute value of the compensating voltage component within a compensating voltage switching level;

an electric potential binarization section configured to output a binarized digital value by binarization of a voltage detection value;

a delay time measurement section configured to measure an ON-delay time and an OFF-delay time, based on the binarized digital value and the PWM command value;

a multiplier configured to:
calculate an error voltage component average value by multiplying an average value of the ON-delay time and the OFF-delay time by a value that is obtained by dividing a direct-current power supply voltage by a half cycle of the triangular wave carrier signal; and
output the error voltage component average value;

a second limiter configured to extract a component of the error voltage component average value that is beyond the compensating voltage switching level in absolute value; and an adder configured to:
set the combined compensating voltage component to a sum of a limited compensating voltage component outputted by the first limiter and a limited error voltage component outputted by the second limiter; and
output the combined compensating voltage component.

2. A controller for a power conversion circuit, comprising:
an electric current control section configured to output a voltage command value, based on a difference between an electric current command value and an electric current detection value;

a PWM generation section configured to output a PWM command value, based on a triangular wave carrier signal and a corrected voltage command value, wherein the corrected voltage command value is a sum of the voltage command value and a combined compensating voltage component;

a dead time adder configured to output a gate signal to a semiconductor switching element of the power conversion circuit by addition of a dead time to the PWM command value;

a compensating voltage calculating section configured to calculate a compensating voltage component, based on the electric current command value;

a first limiter configured to limit an absolute value of the compensating voltage component and within a sum of a voltage drop component of the semiconductor switching element and a compensating voltage switching level;

an electric potential binarization section configured to output a binarized digital value by binarization of a voltage detection value;

a delay time measurement section configured to measure an ON-delay time and an OFF-delay time, based on the binarized digital value and the PWM command value;

a multiplier configured to:
calculate an error voltage component average value by multiplying an average value of the ON-delay time and the OFF-delay time by a value that is obtained by dividing a direct-current power supply voltage by a half cycle of the triangular wave carrier signal; and
output the error voltage component average value;

a second limiter configured to extract a component of the error voltage component average value that is beyond the compensating voltage switching level in absolute value; and an adder configured to:
set the combined compensating voltage component to a sum of a limited compensating voltage component outputted by the first limiter and a limited error voltage component outputted by the second limiter; and
output the combined compensating voltage component.

3. The controller for the power conversion circuit as claimed in claim 1, wherein the compensating voltage switching level is adjusted depending on a state of operation of the power conversion circuit.

4. The controller for the power conversion circuit as claimed in claim 2, wherein the compensating voltage switching level is adjusted depending on a state of operation of the power conversion circuit.

* * * * *